United States Patent

[11] 3,559,774

[72] Inventor Carl E. Bricker
 Cuyahoga Falls, Ohio
[21] Appl. No. 774,438
[22] Filed Nov. 8, 1968
[45] Patented Feb. 2, 1971
[73] Assignee The Goodyear Tire & Rubber Company
 Akron, Ohio
 a corporation of Ohio

[54] AUTOMATIC WEAR COMPENSATOR FOR A SCREW-TYPE BRAKE
 8 Claims, 7 Drawing Figs.
[52] U.S. Cl. .................................................. 188/196,
 188/171
[51] Int. Cl. ................................................ F16d 65/56
[50] Field of Search ............................................
 188/72.73C, 79.5K, 196, 196RR, 166, 171

[56] References Cited
UNITED STATES PATENTS
3,115,217  12/1963  Butler ....................... 188/196(RR)X

*Primary Examiner* — Duane A. Reger
*Attorneys* — F.W. Brunner, P.E. Milliken and Oldham & Oldham ABSTRACT: An automatic friction lining compensator adaptable to a screw-type brake applied either mechanically or by springs. Essentially, a shaft having a screw on one end threadably received in the piston causes movement of the piston upon rotation of the shaft. Rotation is imparted to the shaft by an arm operating through a one-way clutch. The arm is returned to its initial position after actuation of the brake. A second arm is connected to the shaft through a one-way clutch operating in the reverse direction to that associated with the first arm. The shaft is returned towards its initial position by movement of the second arm. However, movement of the second arm greater than a predetermined distance causes release of the one-way clutch associated with the second arm, thereby limiting the return of the shaft to its initial angular position. In this way, compensation for the wear of a friction material actuated by the piston is accomplished.

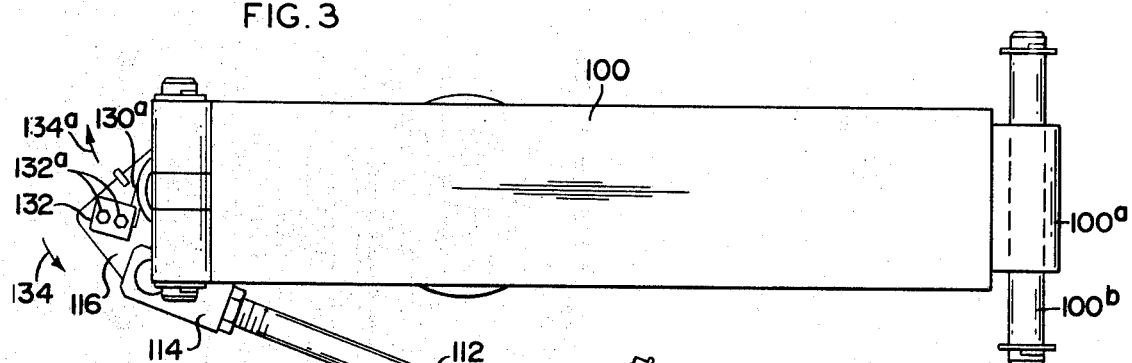
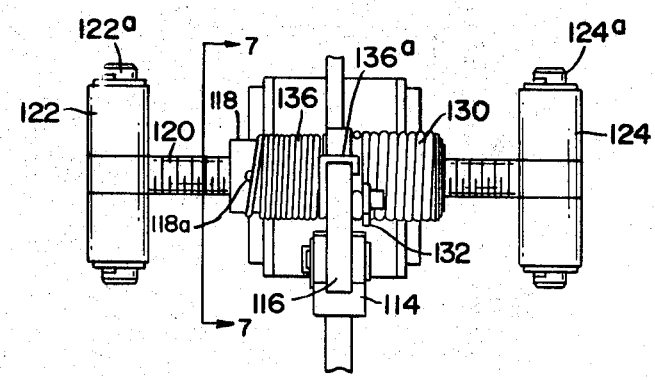
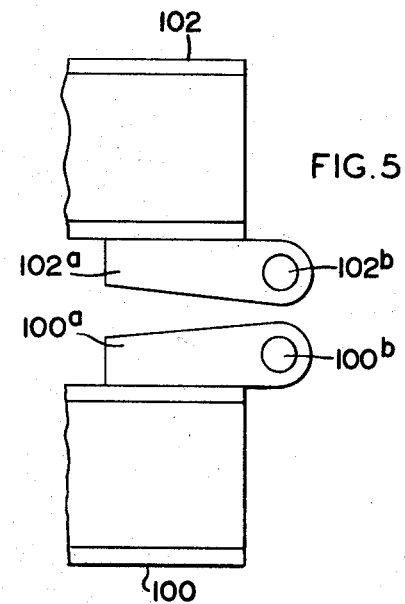
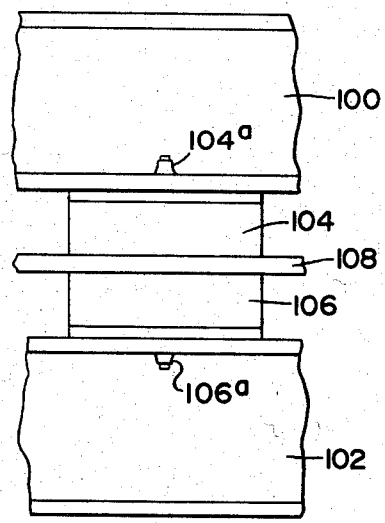

AUTOMATIC WEAR COMPENSATOR FOR A SCREW-TYPE BRAKE

Heretofore it has always been a problem in threaded brakes actuated either by spring force or mechanically to automatically compensate for friction lining wear so that the same arcuate movement of the actuating lever can always take place regardless of lining wear. A lining wear compensator is needed to meet these requirements of the brake art.

The general object of the invention is to provide an extremely simple, yet highly reliable and effective lining wear compensator for association with a screw-type brake which is applied either mechanically or by spring action.

The aforesaid object of the invention and other objects which will become apparent as the description proceeds are achieved by providing in a lining wear compensator for a brake, the combination of a housing, a block slidably carried by the housing, friction material carried by the block, and a shaft rotatably received in nonsliding relation through the housing and threadably engaging the block which is characterized by arm means operating through a one-way clutch to apply torque to the shaft in one direction for a limited distance of movement to apply the brake, means to return the arm means through the same distance of movement when braking release is desired, lever means actuated by the means to return the arm means connected to the shaft through a second one-way clutch reversed from the first one-way clutch, and means to release the clutching action of the second one-way clutch when the lever means has moved a predetermined distance.

For a better understanding of the invention, reference should be had to the accompanying drawings wherein:

FIG. 3 is a side elevation of a modified embodiment of the invention;

FIG. 4 is an end elevation of the embodiment of FIG. 3;

FIG. 5 is a broken-away plan view of the pivoted support for the embodiment of FIG. 3;

Figure 1:
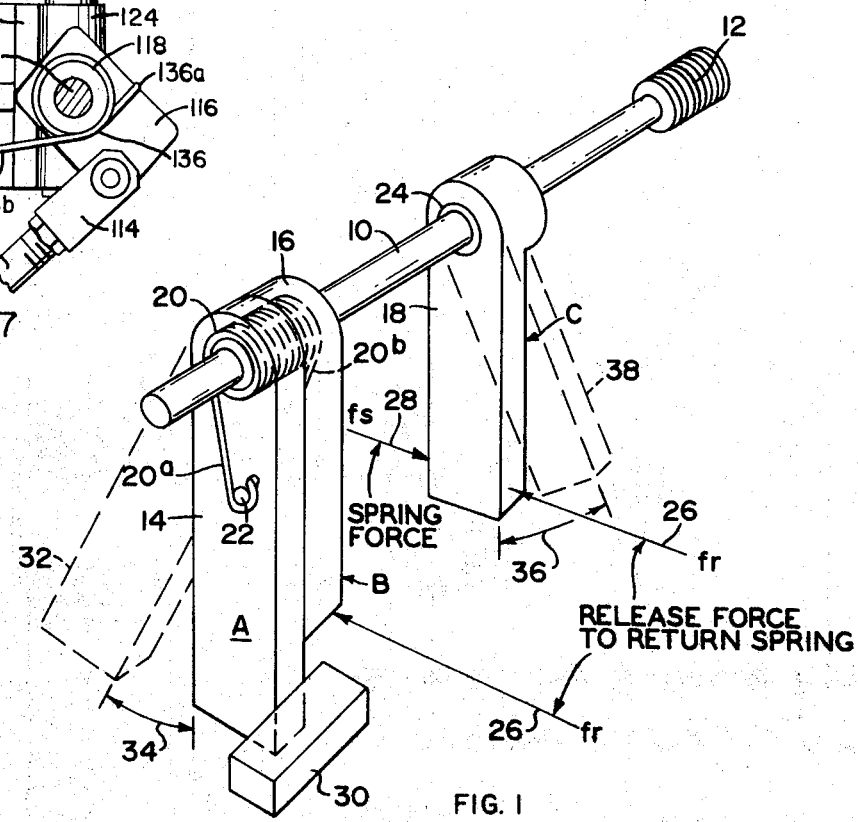
FIG. 1 is a perspective schematic illustration of the principles and structural characteristics of the invention.

FIG. 6 is a broken away plan view of the friction elements utilized in the embodiment of FIG. 3; and With reference to the schematic illustration of the invention shown in FIG. 1, the numeral 10 indicates generally a shaft which has a screw 12 integrally formed on one end thereof. The screw 12 will normally engage with some type of piston (not shown) so that rotation of the screw 12 causes axial displacement of the piston with respect to the shaft 10, and hence either actuation of a brake or deactuation depending upon the direction of rotation of screw 12.

No rotatable support to shaft 10 is shown, although it should be understood that any suitable bearing means to support shaft 10 will meet the objects of the invention.

The essence of the invention, however, is achieved by the method to achieve rotational actuation of shaft 10, in combination with a limited return movement of the shaft depending upon wear of the brake linings actuated by a screw 12. To this end, three arms or levers A, B, and C, designated by numeral 14, 16, and 18, respectively, are mounted to shaft 10 in the following manner: lever or arm A is mounted with a spring clutch 20 around shaft 10 which clutch 20 is connected in fixed angular relationship with respect to arm A by an extended portion 20a held in fixed relationship by a pin 22 affixed to arm A. The other end of spring clutch 20, as depicted by dotted arm 20b, connects in behind arm B, and is actuated thereby. Arm C connects through a one-way roller or spring clutch 24 so that in the schematic illustrated it can only apply rotative to shaft 10 in a counterclockwise direction.

Hence, in operation the schematic is designed for a spring applied brake normally utilized in a fail-safe condition. In this instance, some type of positive pressure means such as an air cylinder or electric solenoid will apply a permanent force $f_r$ against arms B and C as indicated by arrows 26 to hold the brake in the nonactuated position. When such force $f_r$ is released, a spring force $f_s$ indicated by arrow 28 is applied to the end of lever or arm C to cause roller clutch 24 to actuate and turn shaft 10 counterclockwise to advance the piston by means of screw 12 and apply the brake.

Because of the frictional relationship of the arms A and B through spring clutch 20 to shaft 10, the rotation of arm C also carries arms A and B along with the rotation of shaft 10 until arm A is restrained from further movement by a stop 30. The movement of arms A and B is from a dotted line position indicated by numeral 32 through an angle indicated by numeral 34. If the brake is not applied by the time levers A and B have moved through angle 34, additional travel represented by angle 36 of lever arm C is permitted to the dotted line position 38. When the brake is released by the application of force $f_r$, arm C moves through angle 36 without turning shaft 10 until arm B is picked up by the force $f_r$. Arm A moves with arm B because of the same frictional relation through clutch 20. When arm B is returned through angle 34, the action of arm B on end 20b of spring clutch 20 causes rotation of shaft 10 to effect release of the brake. Thus, on the next application, the brake will apply when rotation of shaft 10 of an amount equal to angle 34 has been utilized unless lining wear requires an additional rotation say of an amount equal to angle 36, as explained above. Hence, for each application of the brake the wear of the lining on the previous application is compensated so that brake application is always taken care of within the available power of spring force $f_s$ and the structural advancing requirements of screw 12.

Naturally, it must be understood that the schematic shown in FIG. 1 merely exemplifies the principles necessary to achieve the objects of the invention, and that the structural requirements of the brake can be of many and varied combinations, and can work with a mechanical or spring actuation in a manner similar to or opposite that shown in the schematic. Further, while the clutch associated with arms A and B should preferably be a spring clutch, the clutch associated with arm C can be any type of one-way acting clutch, such as a roller clutch or a spring clutch. The essence of the invention, however, is achieved by utilizing two simple one-way clutches mounted to the same shaft in opposite relationship to allow overriding of the one clutch upon the actuating movement of the other clutch whereby return of the actuating arm does not pick up the first clutch until that amount of angular motion necessary to compensate for lining wear is adjusted for before the shaft is rotated to the brake release position.

Figure 2:
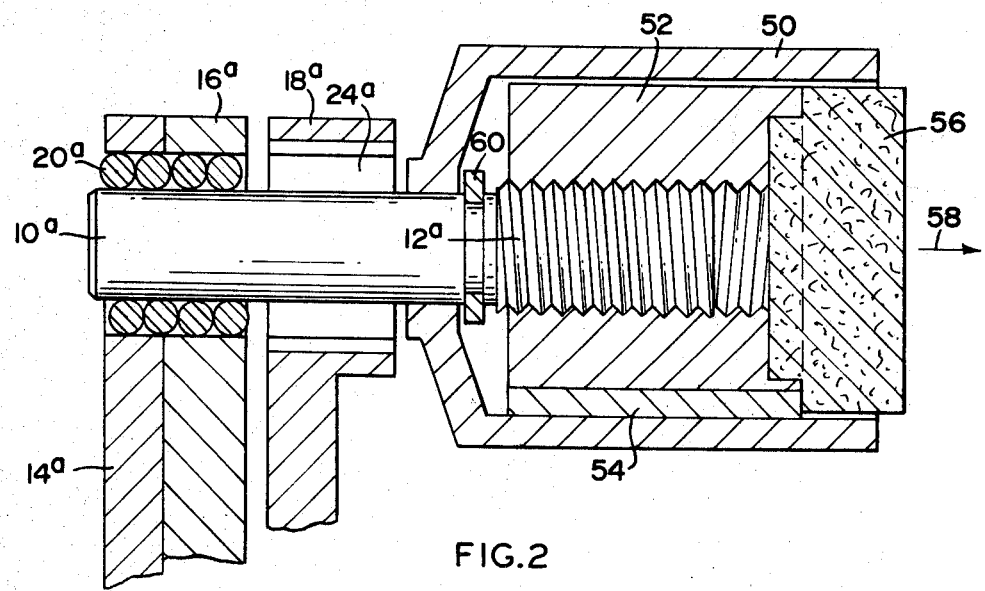
FIG. 2 is an enlarged, broken-away cross-sectional illustration of one embodiment of the invention incorporating the principles of FIG. 1.

A typical structural embodiment of the invention is illustrated in FIG. 2 of the drawings where a brake housing is illustrated by numeral 50 which slidably carries a piston 52 held against rotatable relationship by a guide pin 54. Similar portions of this structure to those illustrated in the schematic are indicated by the same numeral with the suffix a attached. Hence, a screw 12a forming an integral part of shaft 10a is actuated by a lever arm 18 operating through a one-way roller clutch 24a. The piston 52 carries a friction block 56 which when moved axially in the direction indicated by arrow 58 applies the brake in the usual manner. The compensating action is applied by arms 14 and 16, each connected in a respective manner to shaft 10a by a spring clutch 20a. In order to allow for rotation of shaft 10a within housing 50 without any axial movement of such shaft with respect to the housing upon rotation thereof, any convenient means may be utilized, but a slip ring 60 is illustrated which snaps into place around shaft 10a allowing rotation thereof, but affixing the relationship axially of the shaft to housing 50, all in the conventional manner known in the art. Hence, rotation of shaft 10a causes axial movement of piston 52 in a direction dependent upon the direction of rotation of the shaft 10a.

Hence, it should be understood with reference to FIG. 2 that arm 18a applies the brake through the one-way roller clutch 1 24a. Arm 16a releases the brake through the spring clutch 20a, while arm 14a stops the release travel after a preselected angular rotation of shaft 10a to allow for wear compensation, as described with reference to FIG. 1 above. Some type of stop with relationship to arm 14a is necessary to achieve the objects of the invention. In essence, arm 14a merely provides an extension to the one end of spring clutch 20a while arm 16 16a merely provides an extension to the other end of the spring clutch 20a.

For a better understanding of the application to an actual brake, reference should be had to FIGS. 3—6. This modification comprises a pair of I-shaped carrying frames 100 and 102 which are mounted at one end, as shown in FIG. 5, by support brackets 100a and 102a, respectively, pivotally carried on appropriate pins 100b and 102b. Each of the beams 100 and 102 carries a friction block 104 and 106, respectively, supported and mounted by appropriate lock nuts 104a and 106a, as is best illustrated in FIG. 6 of the drawings. The friction blocks clamp onto a rotating disc 108 to provide braking thereof.

The brake is actuated by a spring-type brake actuator indicated generally by numeral 110, as seen in FIG. 3. A suitable brake actuator for this purpose would be a Bendix-Westinghouse Piece 0275787 which is spring actuated and released by air pressure. The actuator 110 operates through a rod 112 connected in adjustable relationship to a linkage 114. Linkage 114 is pivotally connected to an actuating arm 116. The arm 116 is slidably received over an actuating sleeve 118 as best seen in FIG. 4 of the drawings. The a sleeve 118 is fixedly mounted to a screw 120 by means of suitable pin 118a. The screw 120 is threaded in opposite directions on either end. The screw 120 is threadably received in appropriate actuating sleeves 122 and 124, respectively, which are mounted in pivotal relationship to the beams 100 and 102 by appropriate pins 122a and 124a. It should be understood that rotation of the screw 120 in one direction draws the sleeves 122 and 124 closer together, whereas rotation of the screw 120 in the other direction moves the sleeves 122 and 124 further apart, but both movements being in equal an and opposite directions, as is conventional with this type of screw, normally associated with a turnbuckle arrangement, or the like.

The essence of the invention is incorporated in the clutches associated with the arm 116, and this association is substantially the same as in the prior embodiments of the invention. Essentially, an actuating spring clutch 130 is mounted so as to have its one end 130a fixed under plate 132 which is held to arm 116 by appropriate screws 132a. Thus, it should be understood that spring clutch 130 is fixedly mounted to arm 116 and has its other end freely sliding over shaft 118 whereby rotation of arm 116 in the direction indicated by arrow 134 in FIG. 3 causes a tightening of the spring clutch 130 around shaft 118 and rotation of the screw 120 in that direction. The other half of the clutch combination is provided by a spring clutch 136 which is also slidably received in close-fitting relationship over shaft 118 and has the internal end thereof bent up in a hook form at 136a to fit over the width of arm 116. The opposite end 136b of spring clutch 136 rides freely over sleeve 118, but will hit the web 102a of the frame 102 on that side after a certain degree of rotation of arm 116 in the direction of arrow 134.

Hence, in operation, the actuator 110 is normally in the position illustrated in FIG. 3 of the drawings, but when braking action is required, the spring is actuated causing rotation of arm 116 in the direction of arrow 134 which applies the brake by drawing the frames 100 and 102 closer together. Upon release of actuator 110, the arm 116 rotates in the direction of an arrow 134a which automatically releases spring clutch 130 and when arm 116 engages the hooked end 136a of spring 136, the screw 120 is rotated in the opposite direction and the brake is released. Naturally, if lining wear has occurred during the brake application, the other end of spring clutch 136 will have engaged frame 102 causing the hooked end 136a to lift off arm 116. It is with this amount of arcuate clearance that there is no rotation of screw 120 even upon rotation of arm 116 until arm 116 picks up the hooked end 136a upon the return of actuator 110 to its normal position.

Hence, it is seen that an extremely simple, yet highly effective dual clutch wear compensation is utilized in this brake which is preferably used for fail-safe operation. Again, it should be stressed that while two spring actuated clutches are shown, only clutch 136 need actually be a spring clutch to achieve the objects of the invention, and any one-way clutching mechanism may be utilized in place of spring clutch 130. Since brake application takes place through spring clutch 130, as shown in FIG. 4 of the drawings, this spring is of considerably heavier construction than spring clutch 136 which only returns the brake to its deactuated position.

While in accordance with the patent statutes only one best known embodiment of the invention has been illustrated and described in detail, it is to be particularly understood that the invention is not limited thereto or thereby, but that the inventive scope is defined in the appended claims.

I claim:

1. In a lining wear compensator for a brake the combination of:
    a housing, a block slidably carried by the housing, friction material carried by the block, and a shaft rotatably received in nonsliding relation through the housing and threadably engaging the block which is characterized by;
    arm means operating through a one-way clutch to apply torque to the shaft in one direction and for a limited distance of movement to apply the brake;
    means to return the arm means through the same distance of movement when braking release is desired;
    lever means actuated by the means to return the arm means connected to the shaft through a second one-way clutch reversed from the first one-way clutch; and
    means to release the clutching action of the second one-way clutch when the lever means has moved a predetermined distance.

2. A lining wear compensator according to claim 1 where the second one-way clutch is a spring clutch.

3. A lining wear compensator according to claim 2 where the lever means is connected to one end of the spring clutch and the means to release the clutching action of the second one-way clutch is connected to the other end of the spring clutch, and means to positively engage and limit the means to release the clutching action of the second one-way clutch.

4. A lining wear compensator according to claim 1 where the arm means is actuated by a spring for fall-safe type braking action, and the means to return the arm means is a positive mechanical actuation.

5. A lining wear compensator according to claim 1 where the arm means is actuated by a positive mechanical actuation and the means to return the arm means is a spring.

6. A lining wear compensator for a screw-type brake which included:
    means for brake actuation of a fail-safe type;
    a shaft with a screw thread on at least one end thereof adapted to threadably engage with the means for brake actuation;
    a pair of opposed one-way clutch means associated with the shaft;
    at least one lever means to effect rotation to the shaft in one direction through one of the one-way clutch means, and in the other direction through the one-way clutch means, said brake actuation being by a spring action which acts through one of the lever means to provide a limited angular rotation of the shaft; and
    means to limit the one-way clutching action of the one-way clutch not utilized during brake actuation when angular movement of the shaft to return to its original position goes beyond a predetermined angular rotation.

7. A compensator according to claim 6 where separate lever means are associated with each end of the spring and a positive stop mounted so that the one of said lever means which acts to release the clutching action engages with the stop to limit the one-way clutching action of the spring.

8. A compensator according to claim 6 where the means for brake actuation includes a pair of pivoted frame means, friction blocks carried by each frame means, the shaft being threaded on each end in opposite directions and threadably received in the free ends of the frame means, and one of said clutch means being a spring clutch which has one end thereof removably engaging the lever means, and the other end engaging one of the frame means to achieve the limited clutching action desired.

PO-1050
(5/69)

UNITED STATES PATENT OFFICE
CERTIFICATE OF CORRECTION

Patent No. 3,559,774     Dated February 2, 1971

Inventor(s) Carl E Bricker

Figure 7:
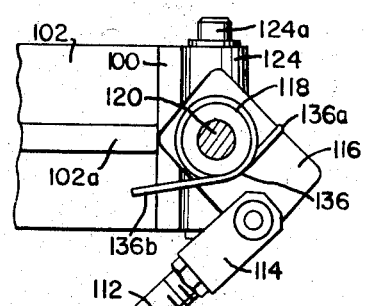

It is certified that error appears in the above-identified patent and that said Letters Patent are hereby corrected as shown below:

Column 1, line 44, after "and" insert --Fig. 7 is a fragmentary sectional view taken along the lines 7-7 of Fig. 4.--.

Column 2, line 73, after "clutch", delete "1".

Column 3, line 5, after "arm", delete "16";
        line 20, "0275787" should read --#275787--.

Column 4, line 44, "fall-safe" should read --fail-safe--;
        line 51, "included" should read --includes--.

Signed and sealed this 13th day of July 1971.

(SEAL)
Attest:

EDWARD M. FLETCHER, JR.
Attesting Officer

WILLIAM E. SCHUYLER,
Commissioner of Patent